United States Patent
De Vos et al.

(10) Patent No.: US 10,948,932 B2
(45) Date of Patent: Mar. 16, 2021

(54) POWER MANAGEMENT INTEGRATED CIRCUIT FOR ENERGY HARVESTING WITH MULTI POWER MODE SELECTION

(71) Applicant: E-PEAS, S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 0 days.

(21) Appl. No.: 16/754,486

(22) PCT Filed: Oct. 17, 2018

(86) PCT No.: PCT/EP2018/078386
§ 371 (c)(1),
(2) Date: Apr. 8, 2020

(87) PCT Pub. No.: WO2019/076975
PCT Pub. Date: Apr. 25, 2019

(65) Prior Publication Data
US 2020/0387182 A1  Dec. 10, 2020

(30) Foreign Application Priority Data
Oct. 18, 2017 (EP) .................... 17196992

(51) Int. Cl.
*G05F 1/46* (2006.01)
*H02J 50/10* (2016.01)
*H02J 50/00* (2016.01)

(52) U.S. Cl.
CPC .............. *G05F 1/46* (2013.01); *H02J 50/001* (2020.01); *H02J 50/10* (2016.02)

(58) Field of Classification Search
None
See application file for complete search history.

(56) References Cited

U.S. PATENT DOCUMENTS 7,719,866 B2 * 5/2010 Boldo ................. G05F 1/67
363/89
8,803,489 B2 * 8/2014 Li ..................... H02M 1/4216
323/207

(Continued)

FOREIGN PATENT DOCUMENTS

WO    2010130473 A1    11/2010

OTHER PUBLICATIONS

Int'l. Search Report for PCT/EP2018/078386, dated Dec. 5, 2018.
(Continued)

*Primary Examiner* — Jeffery S Zweizig
(74) *Attorney, Agent, or Firm* — Blue Filament Law PLLC

(57) ABSTRACT

A power management integrated circuit (PMIC) for managing energy from an energy harvester is provided. The PMIC includes a discontinuous mode (DCM) voltage converter for outputting current pulses wherein the input and output voltages are sensed and digitized. The PMIC includes a power control circuit configured for selecting a power operational mode based on a monitoring of a parameter indicative of the input power $P_{in}$ and based on a comparison of this parameter with one or more parameter reference values. The PMIC further includes a controller configured for defining a maximum peak current of the current pulses based on the input and output voltages of the voltage converter and based on the power mode selected.

20 Claims, 4 Drawing Sheets

(56) References Cited

U.S. PATENT DOCUMENTS

Figure 1A:
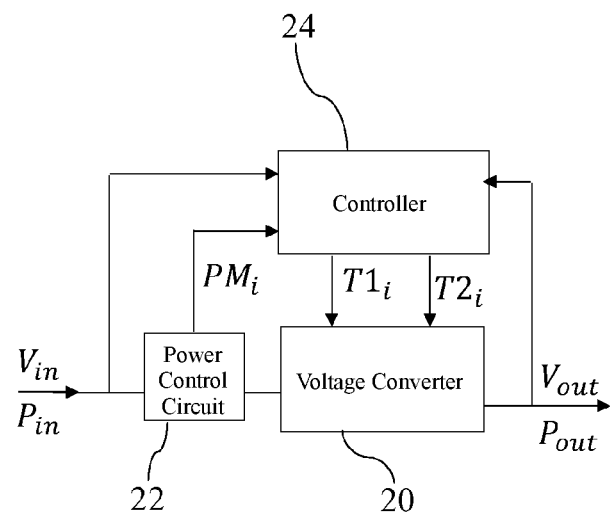

2011/0001360 A1   1/2011   Rua et al.
2016/0197508 A1   7/2016   Kruiskamp

OTHER PUBLICATIONS

Degusseme Ket al: "Digitally Controlled Boost Power-Factor-Correction Converters Operating in Both Continuous and Discontinuous Conduction Mode", IEEE Transactions on Industrial Electronics, IEEE Service Center, Piscataway, NJ, USA, vol. 52, No. 1, Feb. 1, 2005 (Feb. 1, 2005), pp. 88-97, XP011126516, ISSN: 0278-0046, DOI: 10.1109/TIE.2004.841133.

* cited by examiner

POWER MANAGEMENT INTEGRATED CIRCUIT FOR ENERGY HARVESTING WITH MULTI POWER MODE SELECTION

FIELD OF THE INVENTION

The present invention relates to a Power Management Integrated Circuit (PMIC) for managing energy from an energy harvester. More specifically, it relates to a PMIC comprising a discontinuous current mode voltage converter configured for receiving an input power ($P_{in}$) from the energy harvester at an input voltage $V_{in}$ and for outputting an output power ($P_{out}$) at an output voltage $V_{out}$.

The present invention further relates to a method for managing energy from an energy harvester using a PMIC comprising a discontinuous current mode voltage converter.

DESCRIPTION OF PRIOR ART

PMIC's for energy harvesting are known in the art and typically comprise an input terminal for making a connection with the energy harvester for receiving an input power and at least one output terminal for making a connection with an energy storage device. Generally, the PMIC comprises additional output terminals for making connections with one or more application loads. The PMIC comprises a voltage converter for converting the input power received at an input voltage $V_{in}$ into an output power at an output voltage $V_{out}$. Examples of energy harvesters are photovoltaic cells (PV) or thermoelectric generators (TEG).

A PMIC for energy harvesting is for example available from the applicant of the current patent application and known under the reference number AEM10940. This exemplary PMIC with reference AEM10940 operates with input voltages in a range of 100 mV to 2.5V. The PMIC has to be construed as an interface between the energy harvester source, the energy storage device and generally also one or more application circuits. During operation, energy is extracted from the energy harvester source and transferred to the energy storage device via the PMIC. The energy stored in the energy storage device can then be supplied to the one or more application circuits. For example, PMIC's are suitable to handle a typical input power that can vary in the range between 1 microwatts and 1 Watt.

These low-power PMIC's comprise a voltage converter operable in a so-called discontinuous current mode (DCM), generally also named discontinuous conduction mode, wherein an inductor is cyclically charged and de-charged. As a consequence, a DCM voltage converter is outputting the output power by generating current pulses wherein each current pulse comprises a charging period T1 wherein an inducing current in the inductor is increasing until a maximum peak current $I_{max}$ and a subsequent de-charging period T2 wherein the inducing current in the inductor is decreasing back to zero.

However, a problem with the PMIC's is that they have to operate within a wide input and output power range. Indeed, as the power input comes from an energy harvester, the available power depends on the ambient conditions which may vary over time. Also on the output side, the power that can be outputted will depend on what devices are connected to the output terminals of the PMIC such as a storage device and one or more application loads. As a consequence, a DCM voltage converter that is designed to operate at a specific power value will not operate efficiently over the entire power range.

One of the solutions to deal with higher power ranges is to use a continuous current mode (CCM), generally also named continuous conduction mode, voltage converter wherein after charging the inductor, the inducing current in the inductor is not falling back to zero such that the average current that is transferred by the CCM voltage converter is higher when compared to a DCM voltage converter. However, CCM converters are not suitable for low-power PMIC's. Indeed, it would require to reduce the inductor current ripple because of the low average currents. The ripple current could be reduced by using a bigger inductor or by switching the charging and de-charging cycle at a higher frequency. The former solution is not acceptable for tiny low-power applications where a low PCB footprint of the PMIC and the production cost is of high importance. The latter solution ruins the efficiency of the voltage converter, mainly due to increased consumptions of the drivers of the switches of the voltage converter.

In WO2010/130473A1, a converter is disclosed operable in discontinuous and continuous conduction modes. With this converter, the decreasing inductor current during the de-charging period is measured and compared with a threshold level and at the same time the output voltage is measured. Based on these signals, a decision is taking when to switch to a new charging period. In this way, the de-charging period can be adjusted during operation of the converter from pulse to pulse and a switch from a DCM mode to a CCM mode can be made. However, this converter does not address the problems mentioned above related to a variation of the input power and the problems related to the use of a continuous conduction mode of operation.

SUMMARY OF THE INVENTION

It is an object of the present invention to provide a PMIC comprising a DCM voltage converter that is efficiently operable in a broader power range.

The present invention is defined in the appended independent claims. Preferred embodiments are defined in the dependent claims.

According to a first aspect of the invention, a Power Management Integrated Circuit (PMIC) for managing energy from an energy harvester is presented.

Such a PMIC comprises a discontinuous current mode voltage converter configured for receiving an input power $P_{in}$ from the energy harvester at an input voltage $V_{in}$ and configured for outputting an output power $P_{out}$ at an output voltage $V_{out}$. The discontinuous current mode voltage converter is operable for outputting the output power $P_{out}$ by generating current pulses wherein each current pulse comprises a charging period T1 wherein an inducing current is increasing until a maximum peak current $I_{max}$ and a subsequent de-charging period T2 wherein the inducing current is decreasing.

The PMIC according to the invention is characterized in that it comprises a power control circuit configured for monitoring a parameter indicative of the input power $P_{in}$, comparing the parameter with one or more parameter reference values, and selecting a power operational mode from a plurality of power operational modes $PM_i$ based on the comparison of the parameter with the one or more parameter reference values. Each of the power operational modes $PM_i$ of the plurality of power operational modes is characterized by a value for the maximum peak current $I_{max}$. In embodiments, the parameter indicative of the input power $P_{in}$ is monitored at an input of the PMIC where the input power is received.

The PMIC according to the invention further comprises a controller coupled with the power control circuit for receiving the power operational mode selected by the power control circuit.

The controller comprises a sensing means for sensing an actual input voltage and an actual output voltage of respectively the input voltage $V_{in}$ and the output voltage $V_{out}$ of the discontinuous current mode voltage converter (20).

The controller further comprises a processing means configured for generating a first configuration signal $T1_i$ and a second configuration signal $T2_i$ for operating the discontinuous current mode voltage converter, and wherein the first $T1_i$ and second $T2_i$ configuration signals are specifying respectively the charging period T1 and the de-charging period T2. The generating of the first $T1_i$ and second $T2_i$ configuration signals by the controller is based on the actual input voltage and the actual output voltage and based on the power operational mode selected by the power control circuit. The controller is coupled with the discontinuous current mode voltage converter for transmitting the first configuration signal $T1_i$ and the second configuration signal $T2_i$.

Advantageously, by monitoring a parameter indicative of the input power received from the energy harvester and using a controller, the operational parameters of the DCM voltage converter can be adjusted in accordance with the amount of input power received from the energy harvester. Indeed, the maximum power that can be transferred by the DCM power converter is limited by the maximum peak current of the current pulses. If the power input from the energy harvester is increasing and becomes larger than the maximum power the DCM voltage converter can handle, the input voltage will increase. As a consequence, the input voltage deviates from the target voltage $V_T$ for efficiently extracting power from the energy harvester, resulting in a reduction of the efficiency of the voltage converter.

The invention is not limited by the number of power operational modes $PM_i$. In embodiments, the plurality of power operational modes comprises two power modes.

In preferred embodiments, the sensing means comprises a digitizing circuit configured for acquiring the actual input voltage and the actual output voltage and for converting this actual input and actual output voltage into digital signals $V_{D\_in}$ and $V_{D\_out}$, respectively. In these preferred embodiments, the processing means comprises a digital controller coupled with the digitizing circuit for receiving the digital signals $V_{D\_in}$ and $V_{D\_out}$ and coupled with the power control circuit for receiving the power operational mode selected. This digital controller is configured for generating the first configuration signal $T1_i$ and the second configuration signal $T2_i$.

In further embodiments comprising a digital controller according to the invention, the digital controller comprises for each of the plurality of operational power modes PMi a corresponding lookup table $LU_i$, wherein each lookup table $LU_i$ is defining for a plurality of pairs of values for the input and output voltages of the voltage converter a corresponding pair of configuration signals specifying an optimum charging period T1 and an optimum de-charging period T2. In this way, by comparing the digital signals $V_{D\_in}$ and $V_{D\_out}$ with the plurality of pairs of input and output voltages from the lookup table corresponding to the power operational mode selected a closest matching pair of voltage values can be selected and hence an optimum charging period T1 and an optimum de-charging period T2 be obtained.

According to a second aspect of the invention, a method is provided for extracting power from an energy harvester with a power management integrated circuit comprising a discontinued power mode voltage converter. The discontinuous current mode voltage converter according to the method of the invention is operable for receiving an input power $P_{in}$ from the energy harvester and for outputting an output power $P_{out}$ by generating current pulses wherein each current pulse comprises a charging period T1 wherein an inducing current is increasing until a maximum peak current $I_{max}$ and a subsequent de-charging period T2 wherein the inducing current is decreasing.

The method of the invention comprises steps of
  defining a plurality of power operational modes ($PM_i$), wherein each of the power operational modes is characterized by a value for said maximum peak current $I_{max}$;
  monitoring a parameter indicative of said input power ($P_{in}$) from said energy harvester;
  comparing said parameter indicative of the input power ($P_{in}$) with one or more parameter reference values;
  selecting a power operational mode from said plurality of power operational modes ($PM_1$) based on said comparison of the parameter with the one or more parameter reference values;
  sensing an actual input voltage and an actual output voltage of said voltage converter (20);
  based on said actual input and said actual output voltages and based on the power operational mode selected from said plurality of power modes, generating a first configuration signal $T1_i$ and a second configuration signal $T2_i$ for operating said discontinuous current mode voltage converter (20), and wherein said first $T1_i$ and second $T2_i$ configuration signals are specifying respectively said charging period T1 and said de-charging period T2.

Advantageously, by applying the steps of the method as claimed, the DCM voltage converter will always operate efficiently, independently if the energy harvester is supplying more or less power.

SHORT DESCRIPTION OF THE DRAWINGS

Figure 1B:
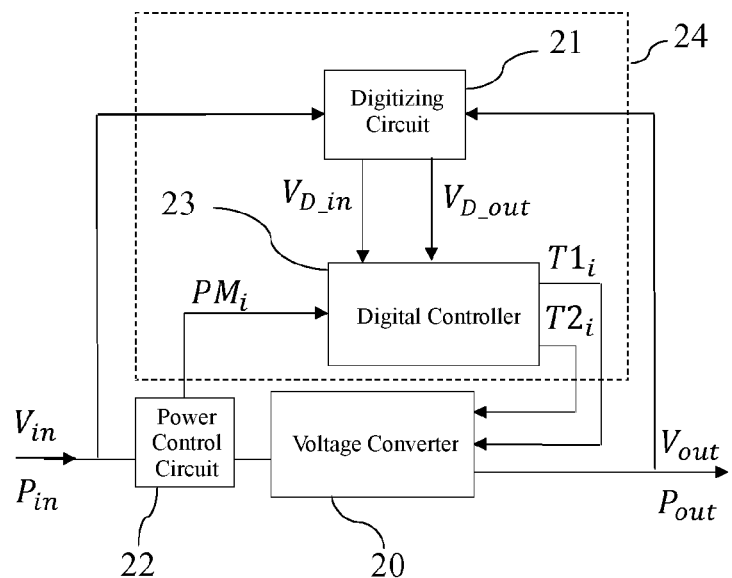
Figure 2A:
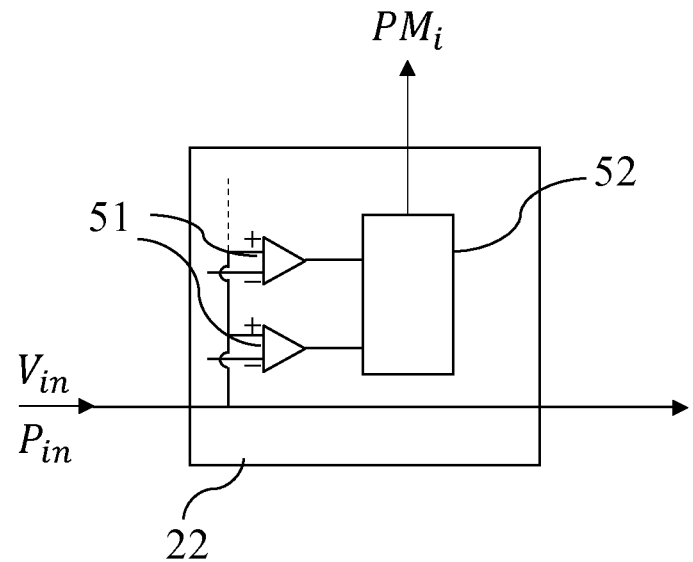
Figure 2B:
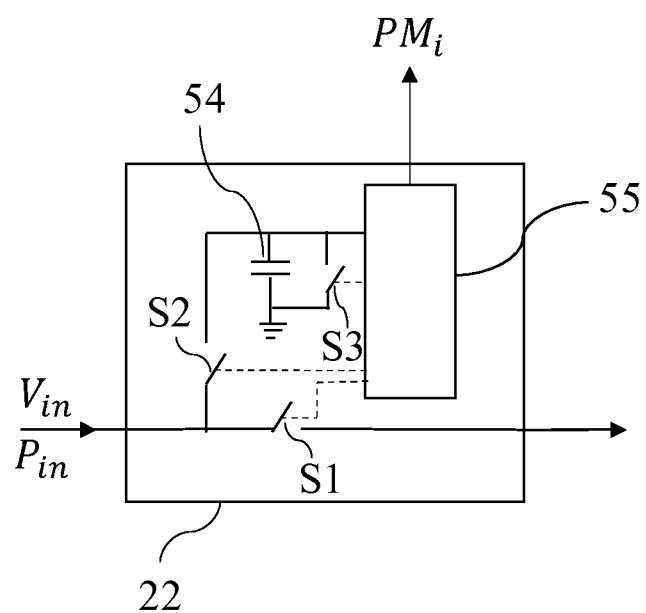
Figure 3:
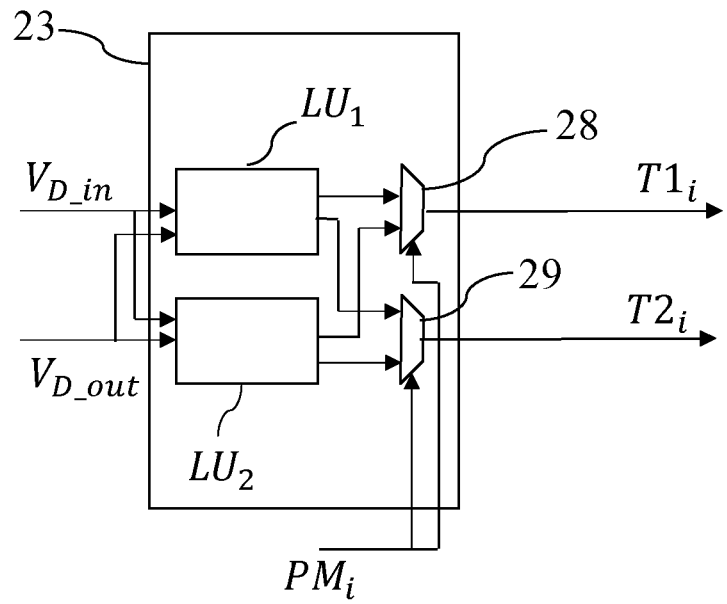
Figure 4:
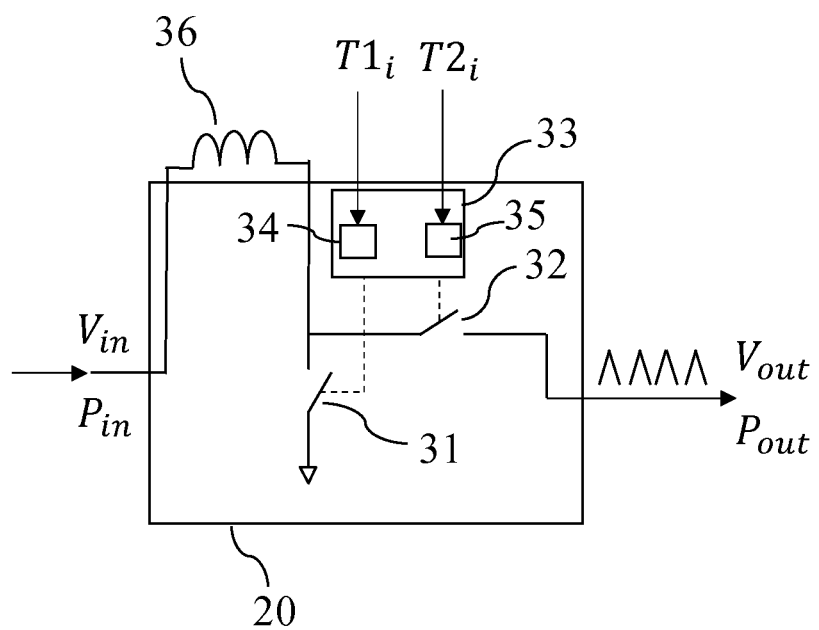
Figure 5:
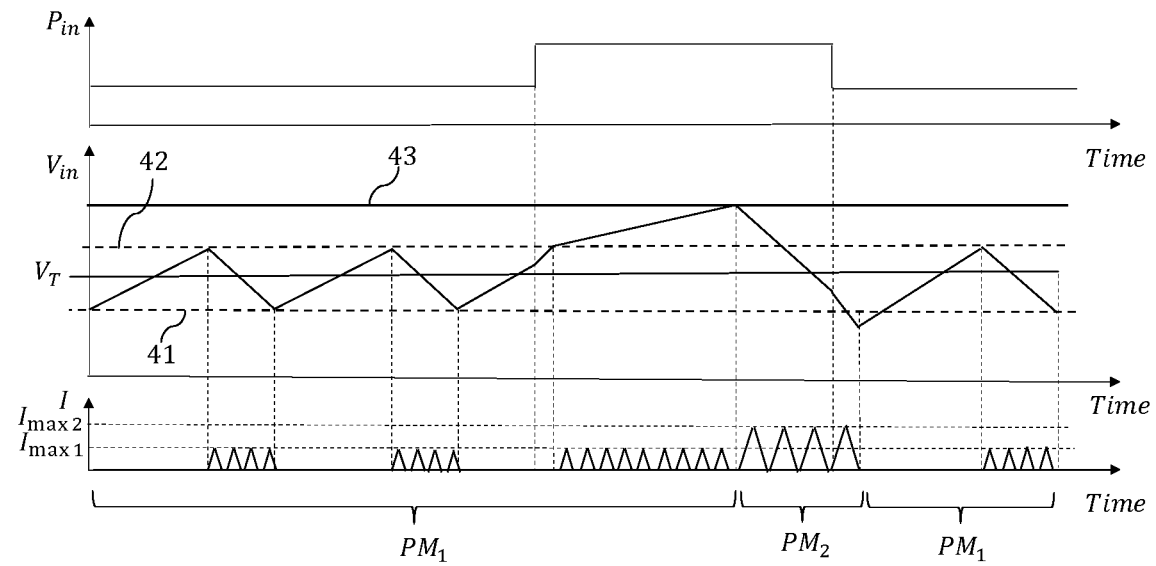
Figure 6:
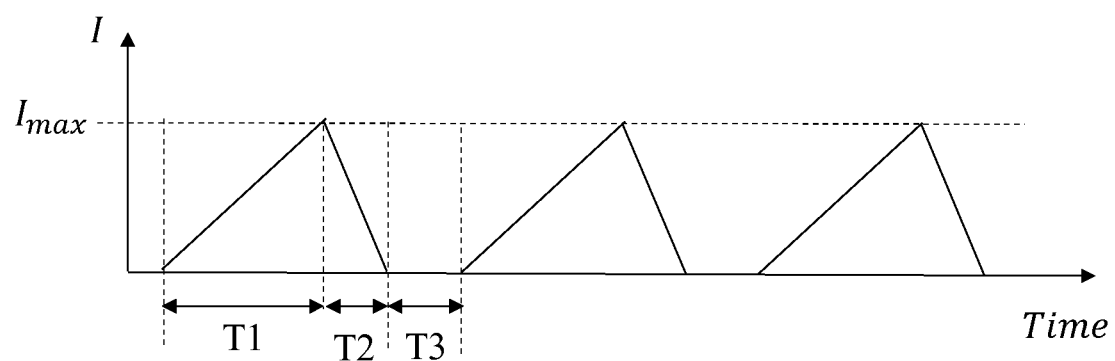

These and further aspects of the invention will be explained in greater detail by way of example and with reference to the accompanying drawings in which:

FIG. 1a schematically illustrates some parts of an electronic circuit of a PMIC according to the invention, FIG. 1b schematically illustrates some parts of an exemplary embodiment of an electronic circuit according to the invention, FIG. 2a schematically illustrates an embodiment of a power control circuit according to the invention, FIG. 2b schematically illustrates a further example of an embodiment of a power control circuit according to the invention, FIG. 3 shows an exemplary embodiment of a digital controller according to the invention, FIG. 4 shows an example of a DCM voltage converter according to the invention, FIG. 5 illustrates a transition between a lower power mode and a higher power mode, FIG. 6 schematically illustrates a pulse train from a DCM voltage converter, The figures are not drawn to scale. Generally, identical components are denoted by the same reference numerals in the figures.

DETAILED DESCRIPTION OF PREFERRED EMBODIMENTS

The PMIC according to the invention has to be construed as a microchip comprising integrated circuits and a number of input/output pins, also named terminals. For example, a PMIC can have between 16 and 32 terminals. Generally, the PMIC's have a compact packaging resulting in a square or rectangular footprint with sides having a length between 3 and 5 mm.

In FIG. 1a, a part of an electronic circuit of a PMIC according to the invention is shown. Not all circuit elements of a PMIC are shown on FIG. 1a, only these circuit elements are shown that are necessary for implementing the invention.

Such a power management integrated circuit (PMIC) for managing energy from an energy harvester according to the invention comprises a discontinuous current mode (DCM) voltage converter 20. The DCM voltage converter 20 is configured for receiving an input power $P_{in}$ from the energy harvester at an input voltage $V_{in}$ and for outputting an output power $P_{out}$ at an output voltage $V_{out}$. As known in the art, a DCM voltage converter uses a inductor and is operable for outputting the output power $P_{out}$ by generating current pulses wherein each current pulse comprises a charging period T1 wherein an inducing current is increasing until a maximum peak current $I_{max}$ and a subsequent de-charging period T2 wherein the inducing current is decreasing. An example of current pulses outputted by a DCM voltage converter is schematically illustrated on FIG. 6.

The DCM voltage converter corresponds to for example a DC-DC boost converter circuit for increasing the input voltage $V_{in}$, or a buck converter circuit for decreasing the input voltage, or a buck-boost converter circuit for both decreasing or increasing the input voltage. These type of voltage converters are known in the art.

The PMIC according to the invention comprises a power control circuit 22 configured for monitoring a parameter indicative of the input power $P_{in}$, comparing the parameter with one or more parameter reference values, and finally selecting a power operational mode from a plurality of power operational modes $PM_i$. The selection of the power operational mode is based on the comparison of the parameter with the one or more parameter reference values. Each of the power operational modes $PM_i$ of the plurality of power operational modes is characterized by a different value for the maximum peak current $I_{max}$.

The value for the maximum peak current $I_{max}$ specifies a power mode as the maximum peak current determines the maximum power the voltage converter can transfer in a given power mode. In other words, a power operational mode has to be construed as an operational setting of the PMIC that allows to extract a given power from the energy harvester. The invention is not limited to the number of power operational modes, the PMIC's according to the invention can switch between at least two power modes. For example a first power mode has a value for the maximum peak current specified at 50 mA and a second power mode has a value specified at 200 mA. Typically, the value for the maximum peak current $I_{max}$ for each of the plurality of power operational modes is specified to be between 10 mA and 500 mA.

Depending on the detailed embodiments, as will be further discussed below, various parameters can be used to monitor the input power supplied by the energy harvester. In some embodiments, this parameter is for example the input voltage $V_{in}$ or alternatively, the parameter is a parameter measuring a deviation of the input voltage $V_{in}$ from a target voltage $V_T$. In other embodiments, the parameter corresponds to a time period for charging a capacitor with an input current from the energy harvester. What exact parameter is monitored is not important, as long as the monitored parameter is indicative of the input power $P_{in}$.

The one or more parameter reference values have to be construed as values associated to a given power mode. Typically, a parameter reference value specifies a border between two power modes. For example, a two power modes PMIC has a reference value indicating at what parameter value to switch from the first to the second power operational mode. A three power mode PMIC according to the invention has at least two parameter reference values, a first parameter reference value defining the border between the first and second power mode and a second parameter reference value defining the border between the second and the third power mode. What quantity the parameter reference value corresponds to will depend on what parameter is used for monitoring the input power $P_{in}$. If the parameter is for example the input voltage, the parameter reference values are voltage values, if for example the parameter monitored is a time period, the parameter reference values correspond to time values.

As illustrated on FIG. 1a, the PMIC according to the invention further comprises a controller 24 coupled with the power control circuit 22 for receiving the power operational mode selected by the power control circuit. The controller 24 comprises a sensing means for sensing an actual input voltage and an actual output voltage of respectively the input voltage $V_{in}$ and the output voltage $V_{out}$ of the discontinuous current mode voltage converter (20). Indeed, the input voltage $V_{in}$ and the output voltage $V_{out}$ of the voltage converter can vary over time and the sensing means allows to obtain actual values of these input and output voltages. The sensing means typically comprises a sensor for sensing voltages, as known in the art.

The controller 24 further comprises processing means configured for generating a first configuration signal $T1_i$ and a second configuration signal $T2_i$ for operating the discontinuous current mode voltage converter 20. The first and second configuration signals specify respectively the charging period T1 and the de-charging period T2 of the current pulses generated by the voltage converter.

The controller 24 is configured for generating the first configuration signal $T1_i$ and the second configuration signal $T2_i$ signal based on the actual input and the actual output voltage sensed and based on the power operational mode selected.

As illustrated on FIG. 1a, the controller 24 is coupled with the discontinuous current mode voltage converter 20 for transmitting the first $T1_i$ and second $T2_i$ configuration signals.

The processing means of controller 24 have to be construed as a signal processing circuit or signal processing controller. Examples of processing means for generating the first configuration signal $T1_i$ and the second configuration signal $T2_i$ will be further discussed below. In preferred embodiments as illustrated on FIG. 1b, the sensing means comprises a digitizing circuit 21 configured for sensing the actual input and actual output voltages of the voltage converter and for converting these actual input and output voltages into digital signals $V_{D\_in}$ and $V_{D\_out}$, respectively. Preferably, the digitizing circuit 21 comprises a sensor for sensing the actual input and output voltages and at least one analog to digital converter (ADC) for digitizing the actual input voltage and actual output voltage.

Typically, the digitizing circuit 21 comprises a first and a second ADC for digitizing the actual input voltage and actual output voltage, respectively. In other embodiments, a single ADC can be used that is switched between the input and output voltages for digitizing the input and output voltages sequentially.

In the preferred embodiment illustrated on FIG. 1b, the processing means of controller 24 comprises a digital controller 23 coupled with the digitizing circuit 21 for receiving the digital signals $V_{D\_in}$ and $V_{D\_out}$ and coupled with the power control circuit 22 for receiving the power operational mode selected. This digital controller 23 is configured for generating the above discussed first configuration signal $T1_i$ and second configuration signal $T2_i$.

As known in the art, a DCM voltage converter 20 comprises at least a first and a second switch configured for controlling the charging period T1 and the de-charging period T2. This is schematically illustrated on FIG. 4 where a first switch 31 and second switch 32 control the charging and de-charging of an inductor 36. In this configuration shown on FIG. 4 when the first switch is closed the second switch is open and vice versa. In this example a boost circuit configuration is shown, but as mentioned above the DCM voltage converter can also comprise a buck or buck-boost circuit. The switches are controlled by a converter controller 33. As known in the art, by cyclically controlling the first and second switch, magnetic energy stored in the inductor 36 is cyclically transferred to the load connected to the voltage converter output that is, in case of a boost converter, at a higher voltage than the input voltage at the converter input. In some embodiments, as illustrated on FIG. 4 the inductor 36 is not necessary part of the voltage converter and the inductor is generally located outside the PMIC.

As illustrated on FIG. 4, the voltage converter according to the invention receives as input the first configuration signal $T1_i$ and the second configuration signal $T2_i$ generated by the digital controller 23. As discussed above, these configuration signals are power mode dependent. In the example shown on FIG. 4, the voltage converter controller 33 is coupled with the digital controller 23 to receive these configuration signals.

In embodiments, the voltage converter controller 33 comprises a first 34 and a second 35 pulse generator. The first pulse generator is configured for generating a first pulse command for controlling the first and/or second switch during the charging period T1. The first pulse command has a pulse width equal or proportional to the charging period T1 specified by the first configuration signal $T1_i$. The second pulse generator is configured for generating a second pulse command for controlling the first and/or second switch during the de-charging period T2. The second pulse command has a pulse width equal or proportional to the charging period T2 specified by the second configuration signal $T2_i$. In this way, the voltage converter according to the invention receiving the power mode dependent configuration signals $T1_i$ and $T2_i$ will automatically adjust the maximum peak current in the inductor, depending on the amount of power supplied by the energy harvester.

In preferred embodiments comprising a digital controller 23 as discussed above, the digital controller 23 comprises for each of the plurality of operational power modes PMi a corresponding lookup table $LU_i$. Each lookup table $LU_i$ is defining for a plurality of pairs of values for the input and output voltages of the voltage converter a corresponding pair of configuration signals specifying the charging period T1 and the de-charging period T2. The lookup tables are for example predefined by calculation. As well known in the art, the charging time period T1 depends on the input voltage, the inductance of the inductor used by the voltage converter and the maximum peak current required according to the selected power operational mode. The de-charging time period T2 depends on the difference in input and output voltage, the inductance and the maximum peak current. Hence, for a given inductance and a given number of specified power operational modes defined by their maximum peak current, the lookup tables can be established in advance for a plurality of input and output voltages.

In these embodiments using lookup tables, the digital controller is further configured for comparing the digital signals $V_{D\_in}$ and $V_{D\_out}$ with the plurality of pairs of input and output voltages from the lookup table corresponding to the power operational mode selected and selecting a closest matching pair of voltage values. A closest matching pair can for example be found by finding the pair of values of the input and output voltages of the lookup table that have the smallest deviation from the measured input and output values. In this way, the optimum configuration signals $T1_i$ and $T2_i$ matching the actual power supplied by the energy harvester are obtained from the lookup table.

In other embodiments, no lookup tables are used but the digital controller comprises processing means for calculating the optimum charging and de-charging periods based on the on the digital signals $V_{D\_in}$ and $V_{D\_out}$, the value of the inductance and the maximum peak current corresponding to the power operational mode selected.

In embodiments, as schematically illustrated on FIG. 3, the digital controller 23 comprises a first multiplexer 28 and a second multiplexer 29 configured for respectively selecting the first configuration signal $T1_i$ and the second configuration signal $T2_i$ from the lookup-table corresponding to the operational power mode selected. The embodiment shown on FIG. 3 is an example wherein the PMIC comprises two power operating modes and hence two lookup tables $LU_1$ and $LU_2$.

As mentioned above, depending on the detailed embodiments of the power control circuit 22, various parameters can be used to monitor the input power supplied by the energy harvester. The parameter is monitored on an input where the input power from the energy harvester is received. A number of exemplary embodiments of power control circuits 22 according to the invention are now discussed.

A first example of a power control circuit 22 is illustrated on FIG. 2a wherein, in this example, the input voltage $V_{in}$ is the parameter that is monitored by the control circuit 22. This control circuit comprises one or more comparators 51 for comparing the input voltage with one or more reference voltages. A controller 52 is configured to select a power mode based on the comparison of the input voltage with the one or more reference values. The one or more reference values are associated to the power modes. If there are for example two power modes, a first parameter reference value is defining when to switch from a first lower power mode to a second higher power mode and a second parameter reference value is defining when to switch back from the higher to the lower power mode. The controller 52 will select the second higher power mode when the input voltage $V_{in}$ has increased above the first parameter reference value, and if the input voltage thereafter decreases below the second reference parameter value, the controller will reselect the lower power mode. Similar, in embodiments where there are more than two power modes, the controller 52 will increment from one power mode to the next power mode when the input voltage has become larger than a parameter reference value and decrement from one power mode down to a lower power, or reset to lowest power mode, when the input voltage thereafter decreases below another parameter reference value.

A second example of a power control circuit 22 according to the invention is shown on FIG. 2b. In this embodiment, the power control circuit 22 comprises a capacitor 54 that is charged with the input current from the energy harvester and the parameter that is monitored is the time to charge the capacitor 54 up to a given voltage. In this example, to monitor the parameter, a first switch S1 is opened and a second switch S2 is closed by a controller 55. The controller 55 measures the charging time of the capacitor 54 until the given voltage is reached and compares this charging time with a number of parameter reference values associated to a plurality of power modes. Based on the comparison, the controller 55 selects a power mode. Also here, the parameter reference values define borderlines between successive power modes and hence define when to switch to another power mode when a borderline is crossed. After the monitoring is completed the capacitor is de-charged by closing switch S3. With this embodiment of the power control circuit 22, the power monitoring is performed cyclically. Advantageously, with this embodiment a direct measurement of the input power is made, which allows to directly select a power mode that is more than one level higher or lower if needed when compared to an actual power mode. For example, for a five power mode PMIC, when operating for example in a second power mode, the controller 55 can select to switch directly to the fourth power mode if the time to charge the capacitor is not only below the parameter reference value to switch to the third power mode but also below the parameter reference value to switch to the fourth mode.

In a third example, similar to the second example, the controller 55 of the power control circuit 22, charges the capacitor 54 during a fixed period of time and measures the resulting voltage. This resulting voltage, which is the parameter indicative of the input power, is then compared with parameter reference values and a power mode is selected based on this comparison.

The operation of an exemplary PMIC according to the invention is schematically illustrated in FIG. 5 where the input power $P_{in}$, the input voltage $V_{in}$ and the current in the inductor as function of time are schematically shown. In the example of FIG. 5, the PMIC is initially operating in a first low power mode $PM_1$ wherein the maximum pulse peak current is equal to $I_{max1}$. As illustrated on this figure, the input voltage $V_{in}$ is fluctuating around a target value $V_T$, which is target operational input voltage value for operating the voltage converter. When the voltage converter is enabled and generates the current pulses, the input voltage generally decreases, if the peak current Imax allows for a transferred power higher than the received input power, and when a lower voltage regulation limit 41, illustrated with a dotted line, is reached, the voltage converter is disabled and the PMIC waits until the input voltage increases until an upper voltage regulation limit 42 is reached. When an upper voltage regulation limit 42, illustrated with a further dotted line, is reached the voltage converter is enabled and restarts generating the current pulses. This control of maintaining the input voltage within the lower 41 and upper 42 regulating limits around a target voltage value $V_T$ is well known in the art and is for example used by the current applicant using the above referenced prior art PMIC, known under the reference number AEM10940.

The PMIC according to the actual invention has the additional feature of varying the maximum peak current of the pulses when the input power is above a reference value.

In the operational example shown on FIG. 5, an embodiment for the power control circuit 22 as shown on FIG. 2a and discussed above is assumed. When the input power of the energy harvester increases, the input voltage $V_{in}$ will increase if the maximum peak current of the pulses is too low to allow for a transferred power higher than the received input power. If the input voltage $V_{in}$, reaches a parameter reference value 43, as illustrated on FIG. 5, the power control circuit 22 selects the second power mode. The controller 24 further adjusts automatically the charging and de-charging periods T1 and T2 in correspondence with the second power mode selected wherein the maximum peak current $I_{max2}$ is larger than the maximum peak current $I_{max1}$ of the first power mode.

When the input power from the energy harvester decreases, $V_{in}$ decreases, if the currently used power mode has a peak current that allows for a transferred power higher than the received input power. When the input voltage $V_{in}$ reaches a further parameter reference value, namely the lower regulation limit 41, the PMIC according to the invention will reset back to the lowest power mode. This is also illustrated on FIG. 5 where following the second power mode delivering pulses with peak current $I_{max2}$ the PMIC has switched back to the first power mode delivering pulses with peak current $I_{max1}$.

In other embodiments, the PMIC will reset to the lowest power mode periodically after a given period of time has lapsed.

When a PMIC is starting form an idle state, the voltage converter will start operating and generating current pulses in a pre-defined power operational mode from the plurality of power operational modes, for example in the power operational mode having the lowest value for the maximum peak current.

In embodiments, the power control circuit 22 comprises a comparator configured for comparing the parameter indicative of the input with the one or more parameter reference values. In some embodiments, the comparator can be based on an operational amplifier. In other embodiments, wherein a digital signal comparator is used, the generally analogue parameter indicative of the input voltage is first digitized using an ADC (analog to digital converter). The parameter reference values can be values locally memorized by the power control circuit, or the parameter reference values can be generated by a reference signal generator. In alternative embodiments, a signal configurator external to the PMIC can be used and parameter reference values can be transmitted through a configuration terminal or connector to the power control circuit. The external signal configurator is for example a resistive divider outputting a fraction of a known reference voltage.

In embodiments, the target operational voltage $V_T$ discussed above and illustrated on FIG. 5 can be a fixed value stored in the PMIC, in other embodiments the target voltage value $V_T$ is a configurable value that can be set through a configuration terminal.

In other embodiments, the PMIC is configured to determine the target voltage $V_T$ by performing a measurement.

For example, in preferred embodiments, the PMIC comprises a power point tracker (PPT) to cyclically determine the target operational input voltage $V_T$ of the voltage converter in order to extract efficiently the power out of the energy harvester. Generally, the target voltage $V_T$ is a voltage that is determined to be optimum for extracting power from the energy harvester. The target operational input voltage $V_T$ determined by the PPT is then communicated to the voltage converter controller 33.

Power point trackers for use with PMIC's for energy harvesting are known in the art. The target voltage is determined by the power point tracker by sensing a voltage at the input of the power point tracker and taking a fraction, e.g. 90%, 80%, 50% or 100%, of this voltage as an target operational voltage value.

The power point tracking is generally based on an open circuit voltage evaluation of the energy harvester. Therefore, the voltage converter is configured such that the voltage at the input of the power point tracker corresponds to the open circuit voltage of the energy harvester. For example when a PV cell is used as an energy harvester, the power point tracker obtains the target operational voltage for the PV cell by taking an 80% fraction of the open circuit voltage of the PV cell as sensed at the input of the power point tracker.

In embodiments according to the invention where the PMIC comprises a power point tracker having digitizing circuit, as discussed above, the power point tracker can be used for sensing and digitizing the input voltage $V_{in}$ and/or the output voltage $V_{out}$ when the PPT is not in use for determining the target voltage.

An example of a current pulse train outputted by a DCM voltage converter for a given selected power operational mode is schematically illustrated in FIG. 6, showing the charging and de-charging time period T1 and T2, respectively. The time period T3 indicated on FIG. 6, is the time period between two consecutive pulses. Indeed, in embodiments according to the invention, the DCM voltage converter 20 is operable for preserving a time period T3 between two consecutive current pulses of the current pulses generated by the DCM voltage converter.

The time period T3 can be a fixed valued or a configurable value. In some embodiments the time period T3 is a fixed value independent of the power mode selected and in alternative embodiments the value T3 is defined for each power operational mode. The time period T3 allows to introduce a timing margin in case the timing periods T1 and T2 have some timing fluctuations. In other embodiments the time period T3 can be increased or reduced in order to allow to fine-tune the average current transferred and hence fine-tune the power that can be transferred in a given power mode.

According to a second aspect of the invention, a method for extracting power from an energy harvester with a power management integrated circuit comprising a discontinued power mode voltage converter is provided. The discontinuous current mode voltage converter of the method is operable for receiving an input power $P_{in}$ from the energy harvester and for outputting an output power $P_{out}$ by generating current pulses. Each current pulse comprises a charging period T1 wherein an inducing current is increasing until a maximum peak current $I_{max}$ and a subsequent de-charging period T2 wherein the inducing current is decreasing.

The method according to the invention comprises steps of defining a plurality of power operational modes $PM_i$, wherein each of the power operational modes is characterized by an operational value for said maximum peak current $I_{max}$. The method further comprises steps of monitoring a parameter indicative of the input power $P_{in}$ received from the energy harvester, comparing the parameter with one or more parameter reference values and selecting a power operational mode from the plurality of power operational modes $PM_i$ based on the comparison of the parameter with the one or more parameter reference values. The method comprises a further step of sensing an actual input voltage and an actual output voltage of the voltage converter 20. In a final step, based on the actual input and actual output voltages of the voltage converter and based on the power operational mode selected from the plurality of power modes, a first configuration signal $T1_i$ and a second configuration signal $T2_i$ for operating the discontinuous current mode voltage converter 20 are generated. These first $T1_i$ and second $T2_i$ configuration signals are specifying respectively the charging period T1 and the de-charging period T2 for generating the current pulses. In this way, by applying the above steps of the method claimed, the DCM voltage converter will operate efficiently, independently if the energy harvester is supplying more or less power.

According to a preferred embodiment, defining a plurality of operational power modes comprises defining for each of the power operational modes PMi a corresponding lookup table $LU_i$, wherein each lookup table $LU_i$ is defining for a plurality of predefined pairs of values of input and output voltages of the voltage converter a corresponding pair of configuration signals specifying an optimum charging period T1 and an optimum de-charging period T2 to obtain the target peak current for the operational power mode.

In further embodiments, the actual input voltage and the actual output voltage are compared with the plurality of predefined pairs of input and output voltages from the lookup table corresponding to the power operational mode selected and a closest matching pair of voltage values is selected. In this way the optimum pair of configuration signals is obtained from the lookup table for generating the first configuration signal $T1_i$ and the second configuration signal $T2_i$.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

The invention claimed is:

1. A power management integrated circuit for managing energy from an energy harvester comprising a discontinuous current mode voltage converter (20) configured for receiving an input power ($P_{in}$) from the energy harvester at an input voltage $V_{in}$ and configured for outputting an output power ($P_{out}$) at an output voltage $V_{out}$, and wherein the discontinuous current mode voltage converter (20) is operable for outputting said output power ($P_{out}$) by generating current pulses wherein each current pulse comprises a charging period T1 wherein an inducing current is increasing until a maximum peak current $I_{max}$ and a subsequent de-charging period T2 wherein the inducing current is decreasing, characterized in that said power management integrated circuit comprises
a power control circuit (22) configured for
a) monitoring a parameter indicative of said input power ($P_{in}$),
b) comparing said parameter with one or more parameter reference values, and
c) selecting a power operational mode from a plurality of power operational modes ($PM_i$) based on said comparison of the parameter with the one or more parameter reference values, and wherein each of the power operational modes ($PM_i$) of said plurality of power operational modes is characterized by a value for said maximum peak current $I_{max}$; and a controller (24) coupled with said power control circuit (22) for receiving the power operational mode selected by the power control circuit, said controller (24) comprises a) a sensing means configured for sensing an actual input voltage and an actual output voltage of respectively said input voltage $V_{in}$ and said output voltage $V_{out}$ of the discontinuous current mode voltage converter (20), and b) a processing means configured for generating a first configuration signal $T1_i$ and a second configuration signal $T2_i$ for operating said discontinuous current mode voltage converter 20, and wherein said first $T1_i$ and second $T2_i$ configuration signals are specifying respectively said charging period T1 and said de-charging period T2, and wherein said generating of the first $T1_i$ and second $T2_i$ configuration signals is based on said actual input voltage and said actual output voltage and based on the power operational mode selected by the power control circuit (22), and wherein said controller (24) is coupled with said discontinuous current mode voltage converter (20) for transmitting said first configuration signal $T1_i$ and said second configuration signal $T2_i$.

2. The power management integrated circuit according to claim 1 wherein said discontinuous current mode voltage converter (20) comprises at least a first switch (31) and a second switch (32) configured for controlling said charging period T1 and said de-charging period T2, a voltage converter controller (33) comprising a) a first pulse generator (34) configured for generating a first pulse command for controlling said first and/or second switch during said charging period T1, and wherein said first pulse command having a pulse width equal or proportional to the charging period T1 specified by said first configuration signal $T1_i$, and b) a second pulse generator (35) configured for generating a second pulse command for controlling said first and/or second switch during said de-charging period T2, and wherein said second pulse command having a pulse width equal or proportional to the charging period T2 specified by said second configuration signal $T2_i$.

3. The power management integrated circuit according to claim 1 wherein said sensing means comprises a digitizing circuit (21) configured for acquiring said actual input voltage and said actual output voltage and for converting said actual input voltage and said actual output voltage into digital signals $V_{D\_in}$ and $V_{D\_out}$, respectively;

and wherein said processing means comprises a digital controller (23) coupled with said digitizing circuit (21) for receiving said digital signals $V_{D\_in}$ and $V_{D\_out}$ and coupled with said power control circuit (22) for receiving the power operational mode selected, and wherein said digital controller (23) is configured for generating said first configuration signal $T1_i$ and said second configuration signal $T2_i$.

4. The power management integrated circuit according to claim 3 wherein said digital controller (23) comprises for each of said plurality of operational power modes ($PM_i$) a corresponding lookup table ($LU_i$), wherein each lookup table ($LU_i$) is defining for a plurality of pairs of values for the input and output voltages of the voltage converter a corresponding pair of configuration signals specifying an optimum charging period T1 and an optimum de-charging period T2.

5. The power management integrated circuit according to claim 4, wherein said digital controller is configured for comparing said digital signals $V_{D\_in}$ and $V_{D\_out}$ with the plurality of pairs of input and output voltages from the lookup table corresponding to the power operational mode selected and configured for selecting a closest matching pair of voltage values.

6. The power management integrated circuit according to claim 4 wherein said digital controller (23) comprises a first multiplexer (28) and a second multiplexer (29) configured for respectively acquiring said first configuration signal $T1_i$ and said second configuration signal $T2_i$ from the lookup-table corresponding to the operational power mode selected.

7. The power management integrated circuit according to claim 3 wherein said digitizing circuit (21) comprises at least one analog to digital converter.

8. The power management integrated circuit according to claim 1 wherein the voltage converter (20) is configured for regulating the input voltage $V_{in}$ at a target voltage VT within lower and upper regulation limits.

9. The power management integrated circuit according to claim 8 comprising a power point tracker for cyclically determining said target value $V_T$ for said input voltage $V_{in}$.

10. The power management integrated circuit according to claim 8 wherein said parameter indicative of said input power ($P_{in}$) corresponds to a parameter measuring a deviation of the input voltage $V_{in}$ from said target voltage $V_T$ or wherein said parameter indicative of said input power ($P_{in}$) corresponds to a time period to charge a capacitor using a current from the energy harvester.

11. The power management integrated circuit according claim 1 wherein said value for the maximum peak current max for each of said plurality of power operational modesis between 10 mA and 500 mA.

12. The power management integrated circuit according to claim 1 wherein said discontinuous current mode voltage converter (20) is operable for preserving a time period T3 between two consecutive current pulses of 20 said current pulses generated by the discontinuous current mode voltage converter.

13. An energy harvesting system comprising a power management integrated circuit according to claim 1, an energy harvester connected to said power management integrated circuit for supplying said input power ($P_{in}$).

14. The energy harvesting system according to claim 13 comprising an inductor (36) coupled to the power management integrated circuit for generating an inductance current for said discontinuous current mode voltage converter (20).

15. The power management integrated circuit according to claim 5 wherein said digital controller (23) comprises a first multiplexer (28) and a second multiplexer (29) configured for respectively acquiring said first configuration signal $T1_i$ and said second configuration signal $T2_i$ from the lookup-table corresponding to the operational power mode selected.

16. The power management integrated circuit according to claim 9 wherein said parameter indicative of said input power ($P_{in}$) corresponds to a parameter measuring a deviation of the input voltage $V_{in}$ from said target voltage $V_T$ or wherein said parameter indicative of said input power ($P_{in}$) corresponds to a time period to charge a capacitor using a current from the energy harvester.

17. A method for extracting power from an energy harvester with a power management integrated circuit comprising a discontinued power mode voltage converter (20), wherein the discontinuous current mode voltage converter (20) is operable for receiving an input power ($P_{in}$) from the energy harvester and for outputting an output power ($P_{out}$) by generating current pulses wherein each current pulse comprises a charging period T1 wherein an inducing current is increasing until a maximum peak current Imax and a subsequent de-charging period T2 wherein the inducing current is decreasing, said method comprising
- defining a plurality of power operational modes ($PM_i$), wherein each of the power operational modes is characterized by a value for said maximum peak current $I_{max}$;
- monitoring a parameter indicative of said input power ($P_{in}$) from said energy harvester;
- comparing said parameter indicative of the input power ($P_{in}$) with one or more parameter reference values;
- selecting a power operational mode from said plurality of power operational modes ($PM_i$) based on said comparison of the parameter with the one or more parameter reference values;
- sensing an actual input voltage and an actual output voltage of said voltage converter (20);
- based on said actual input and said actual output voltage and based on the power operational mode selected from said plurality of power modes, generating a first configuration signal $T1_i$ and a second configuration signal $T2_i$ for operating said discontinuous current mode voltage converter (20), and wherein said first $T1_i$ and second $T2_i$ configuration signals are specifying respectively said charging period T1 and said de-charging period T2.

18. The method according to claim 17 wherein said step of defining a plurality of operational power modes comprises defining for each of said power operational modes ($PM_i$) a corresponding lookup table ($LU_i$), wherein each lookup table ($LU_i$) is defining for a plurality of pairs of values of input and output voltages of the voltage converter a corresponding pair of configuration signals specifying an optimum charging period T1 and an optimum de-charging period T2.

19. The method according to claim 18 wherein the step of generating a first configuration signal $T1_i$ and a second configuration signal $T2_i$ comprises
- comparing said actual input voltage and said actual output voltage with the plurality of pairs of input and output voltages from the lookup table corresponding to the power operational mode selected, and
- selecting a closest matching pair of voltage values, so as to obtain the optimum pair of configuration signals from the lookup table for generating the first configuration signal $T1_i$ and the second configuration signal $T2_i$.

20. The method according to claim 17 comprising a step of driving said discontinuous mode voltage converter (20) for generating one or more current pulses wherein the charging period T1 and the de-charging period T2 of the generated one or more current pulses correspond to said first configuration signal $T1_i$ and said second configuration signal $T2_i$.

* * * * *